United States Patent

Murakami

[11] Patent Number: 5,811,174
[45] Date of Patent: Sep. 22, 1998

[54] PHOSPHORESCENT ARTICLE

[75] Inventor: Kiyokazu Murakami, Kadoma, Japan

[73] Assignee: YKK Corporation, Tokyo, Japan

[21] Appl. No.: 594,850

[22] Filed: Jan. 31, 1996

[30] Foreign Application Priority Data

Feb. 1, 1995 [JP] Japan .................................. 7-034728

[51] Int. Cl.⁶ ................ B32B 3/10; F21K 2/00
[52] U.S. Cl. .................... 428/195; 428/204; 428/213; 428/215; 428/328; 428/332; 428/352; 428/690; 428/913; 428/41.8; 428/42.1; 428/76; 40/542; 250/484.4
[58] Field of Search ..................... 428/690, 913, 428/204, 213, 215, 332, 328, 352, 41.7, 41.8, 42.1, 76, 195; 40/542, 543; 250/484.4, 483.1, 462.1; 313/513

[56] References Cited

U.S. PATENT DOCUMENTS

| | | |
|---|---|---|
| 2,516,727 | 7/1950 | Schultheiss . |
| 3,294,699 | 12/1966 | Lange . |
| 4,340,817 | 7/1982 | Quella et al. . |
| 4,536,656 | 8/1985 | Sowa .................... 250/463.1 |
| 4,913,946 | 4/1990 | Sala et al. ................. 428/38 |
| 5,242,725 | 9/1993 | Weissmann et al. ....... 428/40 |
| 5,415,911 | 5/1995 | Zampa et al. .............. 428/40 |
| 5,698,301 | 12/1997 | Yonetani ................. 428/213 |

FOREIGN PATENT DOCUMENTS

| | | |
|---|---|---|
| A-0 622 440 | 11/1994 | European Pat. Off. . |
| A-0 704 510 | 4/1996 | European Pat. Off. . |
| 52-49245 | 4/1977 | Japan . |
| 60-135246 | 7/1985 | Japan . |
| 2-3704 | 1/1990 | Japan . |

OTHER PUBLICATIONS

The Effect of an Ultrafine Pigment Color Filters on CRT Brightness, Contrast and Color Purity, Sony Sony Corporation, Display Device Gp. K. Ohno, T. Kusunoki and K. Ozawa, pp. 7–13 (date not given).
Database WPI Section Ch, Week 9606, Derwent Publications Ltd., London, GB; Class C07, AN 96–053673, XP002001150 & JP–A–07 313 036 (Nemoto Tokushu Kagaku KK), Dec. 5, 1995.

Primary Examiner—Marie R. Yamnitzky
Attorney, Agent, or Firm—Hill & Simpson

[57] ABSTRACT

A phosphorescent article having a first transparent resin layer, a phosphorescent layer, and a second transparent resin layer sequentially superposed in the order mentioned on a supporting layer possessed of a reflective surface. The phosphorescent layer is coated in a tightly sealed state with the first and second transparent resin layers. Preferably the second transparent resin layer has a projecting part so formed as to protrude from the surface of the part thereof which covers the phosphorescent layer, namely in the part which corresponds to the underlying phosphorescent layer, and a surface layer (printed layer) is printed or applied on the part of the surface other than the projecting part, namely on the surface of the part in which the phosphorescent layer does not exist. $SrAl_2O_4$ is used as a phosphorescent pigment to be contained in the phosphorescent layer and a transparent resin containing no ultraviolet absorbent is used for the first and second transparent resin layers.

16 Claims, 2 Drawing Sheets

PHOSPHORESCENT ARTICLE

BACKGROUND OF THE INVENTION

1. Field of the Invention

This invention relates to a phosphorescent article and more particularly to a phosphorescent article which is capable of absorbing and accumulating light therein and, when placed in a dark place, emitting light.

2. Description of the Prior Art

Heretofore, ZnS:Cu, (Ca, Sr)S:Bi, etc. have been known as phosphorescent pigments (long afterglow phosphors) and ZnS:Cu phosphor has been widely used for luminous paints.

These phosphorescent pigments have the nature of exciting themselves by absorbing the light such as the daylight or the fluorescent light (accumulation of light) and, when placed in a dark place, emitting light. Since these phosphorescent pigments are capable of repeating the cycle of absorbing—accumulating—emitting light over and over again, they find extensive utility in various applications such as marks and signs for prevention of disasters and preservation of safety, various guide signs used in automobiles and buildings, such accessories as tiepins and pendants, dials in watches, and such fishing articles as floats and lures.

For general-purpose applications, these phosphorescent pigments are generally used in the form of phosphorescent sheets by reason of the convenience of handling.

Heretofore, the phosphorescent sheets of this class have been devised in various forms. Generally, ZnS:Cu has been used heretofore as a phosphorescent pigment for these conventional phosphorescent sheets. Japanese Patent Application, KOKAI (Early Publication) No. 52-49,245, for example, discloses a printable seal or sheet which is produced by forming on a substrate of transparent film a luminous layer incorporating a phosphorescent powder (ZnS:Cu) therein and sequentially superposing thereon an adhesive layer and a release layer with or without adhering any layer of cloth, paper, or film to the upper surface of the luminous layer.

The phosphorescent pigment ZnS:Cu which is generally used in such a conventional phosphorescent article as described above, however, is at a disadvantage in yielding to decomposition as by the ultraviolet light and consequently entailing gradual deterioration of the characteristics of accumulating and emitting light. The phosphorescent article which uses the phosphorescent pigment ZnS:Cu of this quality, therefore, has the problem of incurring difficulty in fully discharging the role thereof under outdoor conditions.

To cope with these drawbacks, Japanese Patent Publication No. 02-3,704 discloses a method which comprises sealing fine particles of the phosphorescent pigment in a protective layer made of a synthetic resin which is transparent and capable of absorbing the ultraviolet light and Japanese Patent Application, KOKAI No. 60-135,246 discloses a method which comprises coating a luminous layer containing the phosphorescent pigment with a transparent synthetic resin layer containing an ultraviolet light absorber.

Further, the light emitted by the phosphorescent pigment ZnS:Cu is extremely deficient in afterglow luminance, suffers the afterglow thereof to attenuate quickly, and lacks such luminance as permits visual perception throughout the entire night. For the sake of enabling this phosphorescent pigment to function effectively on the luminous dial of a watch, for example, the practice of incorporating a radioactive substance with the phosphorescent pigment thereby causing the radioactive rays to excite the pigment and ensuring lasting emission of the light from the pigment has been in vogue.

The radioactive substance, however, has disadvantages that it must be handled under a rigid standard of safety control and is subjected to restriction on the largeness of the area to be treated therewith in the phosphorescent article which will come in touch with human body and, moreover, the disposal of the waste arising therefrom incurs great exense.

As a phosphorescent pigment which is free from such drawbacks as have been encountered by the conventionally widely used phosphorescent pigment ZnS:Cu, a $SrAl_2O_4$ phosphor has been recently developed (the 248th Lecture of Fluorophor Society held on Nov. 26, 1993 at Physical Properties Laboratory, Tokyo University).

The phosphorescent pigment $SrAl_2O_4$ possesses excellent basic properties as a phosphorescent pigment. For instance, it enjoys outstanding qualities as exhibiting an emission spectrum (peak wavelength; 520 nm) which approximates the spectrum of human visibility and exhibiting a broad excitation spectrum (peak wavelength; about 365 nm) with high excitation efficiency to the ultraviolet light in the short wavelength region. Further, it manifests an extremely high afterglow luminance about five to ten times or more as high as the conventionally widely used ZnS:Cu and shows gradual attenuation of afterglow.

The phosphorescent pigment $SrAl_2O_4$ is nevertheless at a disadvantage in requiring a considerably long time for excitation to attain saturation of afterglow luminance as compared with the conventional pigment of ZnS:Cu. Further, since $SrAl_2O_4$ is vulnerable to water and moisture, the lamination which uses this pigment demands payment of due consideration to water resistance.

SUMMARY OF THE INVENTION

An object of the present invention, therefore, is to provide a phosphorescent article which makes effective use of the aforementioned outstanding characteristics manifested by $SrAl_2O_4$ as a phosphorescent pigment, eliminates the drawbacks thereof to the fullest possible extent, attains quick excitation, and produces lasting afterglow at high luminance.

Another object of the present invention is to provide a phosphorescent article which excels in such physical properties as light resistance and heat resistance, particularly water resistance, in addition to the phosphorescing properties mentioned above.

A further object of the present invention is to provide a phosphorescent article which not only excels in such phosphorescing properties and physical properties as mentioned above but also allows a pattern of emitted light to be delineated vividly and stereoscopically.

To accomplish the objects described above, in accordance with the present invention, there is provided a phosphorescent article having a first transparent resin layer, a phosphorescent layer, and a second transparent resin layer sequentially superposed in the order mentioned on a supporting layer possessed of a reflective surface. The phosphorescent layer contains $SrAl_2O_4$ as a phosphorescent pigment and is coated in a tightly sealed state with the first and second transparent resin layers. Preferably, the first and second transparent resin layers mentioned above are formed of transparent resin containing no ultraviolet light absorber.

Appropriately, in a preferred embodiment of the present invention which allows a luminescence pattern to be delineated stereoscopically and vividly, the second transparent resin layer mentioned above is provided in the part thereof corresponding to the part in which the underlying phosphorescent layer is disposed with a projecting part formed so as to protrude from the surface thereof and further provided in the surface part other than the projecting part, namely the part in which the phosphorescent layer does not exist, with a surface layer so formed as to conceal the surface of the part mentioned above.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
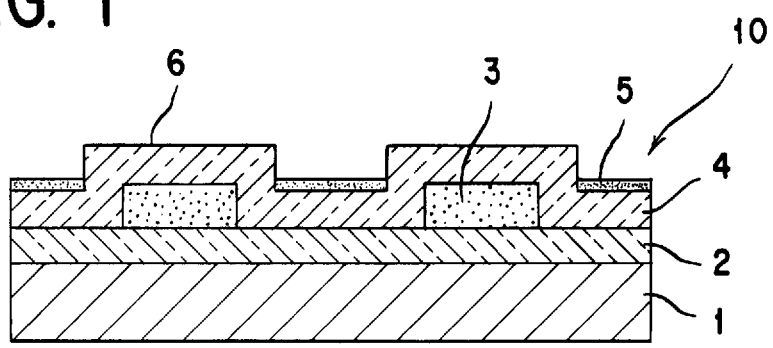
FIG. 1 is a cross sectional view showing one example of the stratal construction of a phosphorescent article of the present invention.

The phosphorescent pigment $SrAl_2O_4$ which is used in the present invention, as described above, possesses such excellent qualities as producing extremely high luminance and possessing a long afterglow time, that is to say, continuing the emission of light for a long time when it emits light in a dark place after absorption and accumulation of light (excitation). It nevertheless is at a disadvantage in requiring a considerably long time for excitation as compared with the conventionally popularly used phosphorescent pigment ZnS:Cu and being deficient in water resistance.

The phosphorescent article according to the present invention, therefore, is provided with a first transparent resin layer, a phosphorescent layer containing a phosphorescent pigment $SrAl_2O_4$, and a second transparent resin layer sequentially superposed in the order mentioned on a supporting layer possessed of a reflective surface and, owing to this stratal structure, allows an incident light to be sufficiently passed through the second transparent resin layer and absorbed in the phosphorescent layer and further allows the light which has escaped this absorption to be reflected on the reflective surface of the supporting layer, passed through the first transparent resin layer, and absorbed again in the phosphorescent layer for the purpose of enabling the incident light to be efficiently absorbed in the phosphorescent layer and curtailing the time necessary for the excitation of the phosphorescent pigment. Since the phosphorescent article further has the phosphorescent layer thereof coated in a tightly sealed state with the first and second transparent resin layers, it imparts protection against moisture and water to the phosphorescent layer which is deficient in resistance to water, enables the phosphorescent layer to manifest amply the phosphorescing action mentioned above for a long time, and further confers augmented durability on the phosphorescent layer.

Owing to the adoption of the stratal construction described above, the phosphorescent article of the present invention acquires quick excitation and manifests an outstanding function and effect of emitting light at high luminance for a long time. Moreover, it is capable of efficiently and infallibly repeating the cycle of absorption—accumulation (excitation)—emission of light and can be extensively utilized in various applications which demand emission of light in a dark place. Further, since $SrAl_2O_4$ is used as the phosphorescent pigment, the produced phosphorescent article is deteriorated only sparingly by the ultraviolet light and, therefore, can be used outdoors with improved durability. Since this phosphorescent article contains no radioactive substance, it avoids exerting any adverse effect on human body and has no restriction on the largeness of the phosphorescent surface.

In a preferred embodiment of the phosphorescent article of the present invention, the surface side of the phosphorescent layer is thoroughly protected because the second transparent resin layer is provided in the part thereof corresponding to the part in which the underlying phosphorescent layer is disposed with a projecting part formed so as to protrude from the surface thereof. Further, since the phosphorescing part is three-dimensionally formed, the luminescence pattern is delineated stereoscopically and the fastness of adhesion between the phosphorescent layer and the transparent resin layers is improved.

Further by superposing a surface layer (printed layer) on the surface part of the second transparent resin layer which is not underlaid by the phosphorescent layer thereby concealing the surface part mentioned above, the randomly scattered light from the phosphorescent layer is prevented from passing through the shielded surface part mentioned above and allowed to pass exclusively through the surface part in which the phosphorescent layer exists, with the result that the luminescence pattern gains in vividness.

The preferred thickness of the first transparent resin layer is in the range of from 50 to 100 $\mu$m. If the thickness of the first transparent resin layer is less than 50 $\mu$m, this resin layer will be at a disadvantage in not easily ensuring ample preclusion of the otherwise inevitable permeation of moisture or water via the underlying layer (supporting layer), readily sustaining a crack under the pressure exerted as during the process of molding or the impact of flexure inflicted as during the course of actual use, and early ceasing to afford amply the protection mentioned above. Conversely, if the thickness exceeds 100 $\mu$m, the resin layer will be at a disadvantage in suffering the distance thereof to the underlying supporting layer to be unduly increased and consequently incurring difficulty in causing the light reflected on the surface of the supporting layer to be efficiently absorbed and accumulated in the phosphorescent layer. The unduly large thickness further goes to increase the combined thickness of the component layers of the phosphorescent article and decrease the flexibility of the phosphorescent article to the extent of rendering the deformation thereof difficult. For the purpose of enabling the phosphorescent article to retain proper flexibility, therefore, the overlying second transparent resin layer is at a disadvantage in inevitably requiring to decrease the thickness thereof.

The preferred thickness of the phosphorescent layer is in the range of from 50 to 250 $\mu$m. If this thickness is less than 50 $\mu$m, the phosphorescent article of the present invention will not sufficiently manifest the expected effects, namely quick excitation, high luminance, and long afterglow.

The luminance and the afterglow time increase in proportion as this thickness increases. If the thickness exceeds 250 μm, however, the excess will prove uneconomical because it will bring about no proportionate improvement in such characteristics as quickness of excitation, luminance, or afterglow property, which are already in the saturated state. When the phosphorescent article is intended for such uses as escutcheons or emblems which are destined to be deformed (as by bending or stretching) while in service, the thickness of the phosphorescent layer preferably is in the range of from 150 to 250 μm in consideration of the possibility of the phosphorescent article sustaining damage by deformation.

Finally, the preferred thickness of the second transparent resin layer is in the range of from 100 to 400 μm. If this thickness is less than 100 μm, the second transparent resin layer will not satisfactorily function as a protective layer and will be readily susceptible to external influences (the action of water, heat, etc.) because of unduly small thickness. The second transparent resin layer, when exposed to an external influence, will encounter difficulty in enabling the phosphorescent layer to retain its phosphorescence property. Thus, the objects of the present invention will not be easily accomplished.

If the thickness of the second transparent resin layer is not less than 100 μm, the phosphorescent article will acquire flexibility enough to avoid sustaining such damages as breakage and wrinkle when applied to a surface of an object by adhesion, protect the phosphorescent layer against damage as by bending, and manifest an excellent protective function for the sake of coping with external influences. If the thickness of the second transparent resin layer exceeds 400 μm, however, the phosphorescent article will become so rigid as to diminish its flexibility and suffer from the disadvantage of encountering difficulty in adhering to a curved surface or the like, readily peeling off the surface after the adhesion, and easily sustaining a crack or fracture while being cut. This excessive thickness is further at a disadvantage in being liable to degrade the luminance of the light to be emitted by the phosphorescent layer.

Now, the present invention will be described more specifically below with reference to preferred embodiments and working example shown in the accompanying drawings.

FIG. 1 illustrates one example of the stratal structure of a phosphorescent article 10 of the present invention. In FIG. 1, the reference numeral 1 stands for a supporting layer or substrate, 2 for a first transparent resin layer, 3 for a phosphorescent layer, 4 for a second transparent resin layer, and 5 for a surface layer (printed layer).

The supporting layer 1 may be made of such a material as nonwoven fabric, felt, cloth, synthetic resin sheet, or metal sheet, whichever most fits the purpose for which the phosphorescent article is used. The thickness of the supporting layer 1 may be selected so as to suit the purpose of use with due consideration for factors such as, for example, adhesiveness of the layer to a curved surface or the like and liability of the layer to sustain a crack under the impact of sheet cutting. When the phosphorescent article is intended for such uses as escutcheons or emblems which are destined to be deformed (as by bending or stretching) while in service, the nonwoven fabric proves to be the most suitable material for the supporting layer 1.

In order to reflect the incident light which has escaped being initially absorbed in the phosphorescent layer 3 and enable the reflected light to be absorbed in the phosphorescent layer 3, the supporting layer 1 must be capable of reflecting light. When the material used for the supporting layer 1 is devoid in itself of the reflecting property as in the case of nonwoven fabric, it is required to incorporate therein a white pigment such as, for example, titanium dioxide or titanium white and consequently assume a white color. Alternatively, the reflecting property may be imparted to the substrate by applying, printing, or attaching a coating material, ink, sheet, or the like which contains a white pigment on the surface of the substrate.

The first transparent resin layer 2 is superposed on the surface of the supporting layer 1 for the purpose of enhancing the adhesiveness of the phosphorescent layer 3 to the supporting layer 1 and, at the same time, preventing moisture and water from penetrating into the phosphorescent layer 3 through the supporting layer 1. Further, on the surface of the first transparent resin layer 2, the phosphorescent layer 3 is superposed in a pattern necessary for the intended purpose.

The phosphorescent layer 3 is a layer which contains the phosphorescent pigment $SrAl_2O_4$ possessing the nature of being excited by absorbing such light as the daylight or the fluorescent light (accumulation of light) and, when placed in a dark place, emitting light. It constitutes a main layer of the phosphorescent article 10.

The formation of the phosphorescent layer 3 is effected by dispersing a phosphorescent pigment composed mainly of $SrAl_2O_4$, for example, in a varnish prepared by dissolving a resin as a binder in a solvent thereby preparing an ink and printing or applying this ink on a surface of the first transparent resin layer 2 by a suitable process such as, for example, a silk screen printing. The content of $SrAl_2O_4$ in the phosphorescent layer may be so set that it may fall in the range of from 70 to 85% by weight in the eventually formed film. If the content is less than 70% by weight, the light which is emitted will be deficient in luminance. Conversely, if the content exceeds 85% by weight, the incorporation of the phosphorescent pigment into the varnish during the preparation of the ink will be attained with difficulty. Generally, in consideration of the loss of weight by drying (as by volatilization of the solvent) after the formation of the film, the content of $SrAl_2O_4$ in the ink is proper in the approximate range of from 40 to 60% by weight.

Generally, the phosphorescent pigment $SrAl_2O_4$ is obtained by adding such an activator as a rare earth element (lanthanide), e.g., europium (Eu), to $SrCO_3$, $Al_2O_3$, and a flux compounded in a prescribed ratio, mixing the components, calcining the resultant mix at an elevated temperature exceeding about 1200° C. in a reducing atmosphere for several hours, and finely pulverizing the calcined mix. Accordingly, the phosphorescent pigment produced by this procedure is composed predominantly of $SrAl_2O_4$ and, in most cases, may contain a rare earth element (lanthanide) such as europium mentioned above.

Examples of the resins used for preparing the varnish may include the resins enumerated hereinafter as to be used for the transparent resin layer. The preferred resin for the varnish is an acrylic resin, a vinyl chloride-acrylic resin (copolymer), or the like in consideration of the necessity of resistance to heat. The printing is attained advantageously by the silk screen processing.

The second transparent resin layer 4 is superposed as a protecting layer on the phosphorescent layer 3 mentioned above.

Unlike the conventional protective layer, the first transparent resin layer 2 and the second transparent resin layer 4 mentioned above ought to use a transparent resin containing no ultraviolet light absorber. The phosphorescent pigment $SrAl_2O_4$ which is contained in the phosphorescent layer 3, unlike the conventionally popularly used pigment ZnS:Cu, is deteriorated only sparingly by the ultraviolet light and is excited by the ultraviolet light (200 to 450 nm). By heightening the ultraviolet transmittance of the first and second transparent resin layers 2 and 4, therefore, the phosphorescence property of the phosphorescent layer 3 is improved. The transparent resin layers, when they are deficient in transparency, have poor light transmittance and inevitably obstruct the emission of light by the phosphorescent layer.

Further, the major factor for the deterioration of the phosphorescent pigment $SrAl_2O_4$ resides in the action of water and moisture. In regard to the function of the first and second transparent resin layers 2 and 4 as protective films, therefore, it is thought necessary to select a resin excellent in water resistance for the transparent resin layers. When the phosphorescent article is to be used in an automobile, for example, since the interior of the automobile possibly reaches a temperature exceeding 80° C. in the summer season, this phosphorescent article at times is required to use a resin which is resistant to heat.

The materials for the first and second transparent resin layers 2 and 4 may be selected from among suitable resins so as to fit the use for which the phosphorescent article is intended, with consideration for the various factors mentioned above. As concrete examples of the resins, polyurethane, polycarbonate, acrylic resin, polyvinyl chloride, and polyester may be cited. Particularly when the phosphorescent article is sewn as in the form of an escutcheon or emblem to an article of clothing and destined to be dry cleaned, a transparent polyurethane resin which has ideal resistance to dry-cleaning is advantageously used.

The second transparent resin layer 4 is so superposed that the part thereof coating the phosphorescent layer 3 is projected from the surface thereof, namely the part thereof corresponding to the underlying phosphorescent layer 3 is caused to form a projecting part 6. Since the phosphorescent layer 3 is formed mainly of the phosphorescent pigment $SrAl_2O_4$, it indeed fails to manifest very high adhesiveness to the transparent resin layers. Since it is enclosed and tightly sealed with the first transparent resin layer 2 and the second transparent resin layer 4 as described above, these resin layers augment the strength of union of the component layers and retain infallibly the phosphorescent layer 3. Further, the surface side of the phosphorescent layer 3 is thoroughly protected and, at the same time, the luminescence pattern is delineated stereoscopically because the phosphorescing part thereof is three-dimensionally formed. The first and second transparent resin layers 2 and 4 are appropriately made of the substantially same synthetic resin for the purpose of enhancing the interlaminar strength between the first transparent resin layer 2 and the second transparent resin layer 4 and enabling the phosphorescent layer 3 to be tightly sealed and retained infallibly between the two resin layers 2 and 4.

The surface layer (printed layer) 5 is printed or applied on the surface part of the second transparent resin layer 4 other than the projecting part 6, namely the surface of the part in which the phosphorescent layer 3 does not exist thereunder. The surface layer (printed layer) 5 is intended to intercept the light which is emitted from the phosphorescent layer 3. For the formation of the surface layer 5, such material as ink or coating material which is capable of forming a light-shielding layer can be used advantageously. Since the surface layer (printed layer) 5 of this nature conceals the surface part of the second transparent resin layer 4 which is not underlain by the phosphorescent layer 3, the randomly scattered light from the phosphorescent layer 3 is prevented from passing through the surface layer (printed layer) 5 and allowed to advance exclusively through the projecting part 6, with the result that the stereoscopic luminescence pattern gains more in vividness.

The formation of the phosphorescent article 10 is effected by sequentially superposing the first transparent resin layer 2, the phosphorescent layer 3, and the second transparent resin layer 4 having the surface layer (printed layer) 5 deposited in advance therein by printing or coating in the order mentioned on the surface of the supporting layer 1 and heating and press molding the superposed layers until fast adhesion. The surface layer (printed layer) 5 may be printed or applied in advance on the second transparent resin layer 4 as described above. Otherwise, after the supporting layer 1, the first transparent resin layer 2, the phosphorescent layer 3, and the second transparent resin layer 4 have been press molded, this surface layer may be printed or applied on the second transparent resin layer 4 while the projecting part 6 is kept in a masked state.

The protection of the phosphorescent layer 3 against the pressure exerted thereon from above (the surface layer side) during the course of press molding can be infallibly attained because the part of the second transparent resin layer 4 corresponding to the phosphorescent layer 3 is shaped into the projecting part 6 and the resin layer of an ample thickness is present on the surface side of the phosphorescent layer 3. Further, when such a porous material as nonwoven fabric is used for the supporting layer 1, part of the first transparent resin layer 2 which is softened during the course of press molding penetrates into the pores or gaps in the supporting layer 1 and joins the supporting layer 1 and the first transparent resin layer 2 with increased fastness.

Figure 2:
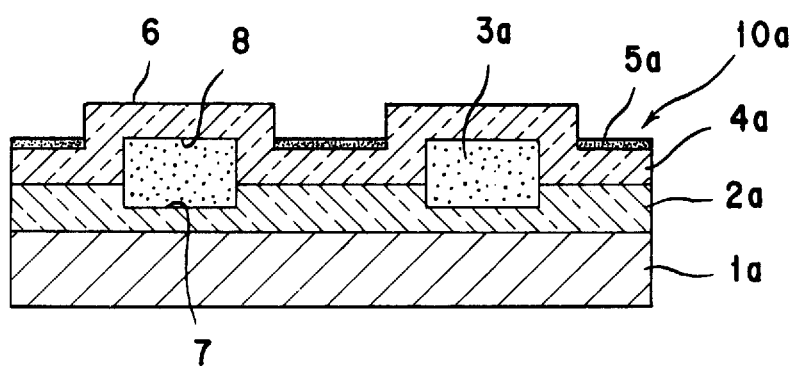
FIG. 2 is a cross sectional view showing one example of the modification of the phosphorescent article shown in FIG. 1.

FIG. 2 illustrates another example of the structure of the phosphorescent article of the present invention. Though this phosphorescent article 10a is similar in stratal structure to the phosphorescent article 10 shown in FIG. 1, it is different from the phosphorescent article 10 shown in FIG. 1 in respect that a depressed part 7 is formed in the part of a first transparent resin layer 2a in which a phosphorescent layer 3a is disposed. The phosphorescent layer 3a, accordingly, is enclosed and tightly sealed with the depressed part 7 of the obverse surface of the first transparent resin layer 2a and a depressed part 8 of the reverse surface of a second transparent resin layer 4a. This structure can augment the strength of union between the first and second transparent resin layers 2a and 4a and the phosphorescent layer 3a.

Incidentally, when a relatively soft synthetic resin is used as the material for the first transparent resin layer 2a, part of the phosphorescent layer 3a is embedded into the first transparent resin layer 2a by simultaneous application of heat and pressure during the course of press molding to permit manufacture of the phosphorescent article 10a of such a structure as shown in FIG. 2.

Figure 3:
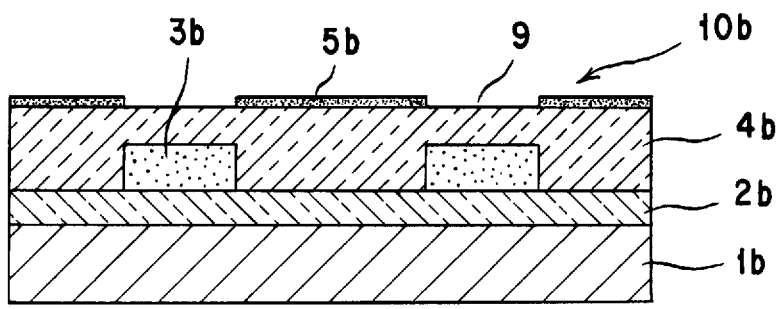
FIG. 3 is a cross sectional view showing the stratal construction of another example of the phosphorescent article of the present invention.

FIG. 3 shows yet another example of the structure of the phosphorescent article of the present invention. This phosphorescent article 10b is similar in stratal structure to that shown in FIG. 1. It is nevertheless different from the phosphorescent article 10 shown in FIG. 1 in respect that a second transparent resin layer 4b is provided with a flat surface.

In this phosphorescent article 10b, a gap 9 in the pattern of a surface layer (printed layer) 5b printed or applied on the surface of the second transparent resin layer 4b functions as a window for light emission. Thus, the light emitted from a phosphorescent layer 3b is radiated through this light-emitting window 9 to produce a vividly delineated luminescence pattern.

The phosphorescent article of the present invention, optionally depending on the nature of intended use, may be provided on the reverse surfaces of the supporting layers 1, 1a, and 1b each with an adhesive layer and further on the adhesive layer with a release paper so as to facilitate the use.

By having the adhesive layer and the release paper sequentially superposed on the reverse surfaces of the supporting layers as described above, the phosphorescent article can be conveniently used because it only requires simple separation of the release paper before it is applied to a given surface of a support (a finished product or a part).

Now, a working example embodying the present invention in an escutcheon or emblem will be described below.

Figure 4:
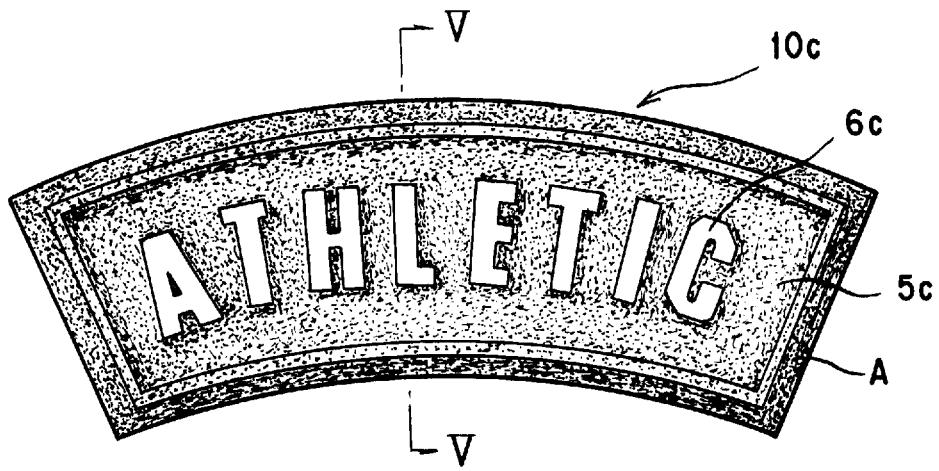
FIG. 4 is a plan view of one example of a phosphorescent escutcheon or emblem (wappen) embodying the present invention.
Figure 5:
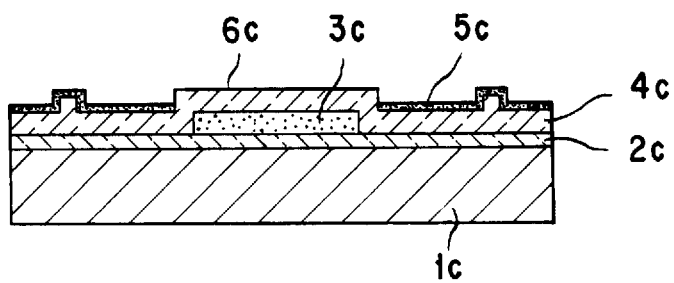
FIG. 5 is an enlarged cross sectional view taken along the line V—V of FIG. 4.

As shown in FIG. 4 and FIG. 5, on a supporting layer 1c formed in a thickness of 1.4 mm with nonwoven fabric containing a white pigment, a first transparent resin layer 2c of a thickness of about 70 $\mu$m made of a transparent hot-melt type urethane resin containing no ultraviolet light absorber is superposed, then a phosphorescent layer 3c of the shape of a necessary pattern is formed thereon in a thickness in the range of from 150 to 200$\mu$m by the wet-on-wet coating of an ink containing phosphorescent pigment $SrAl_2O_4$ by means of the silk screen processing, and thereafter a second transparent resin layer 4c containing no ultraviolet light absorber, formed of a transparent urethane film 0.2 mm in thickness, and having a printed layer 5c such as of a logo partly applied thereon by printing is superposed further thereon except for the part corresponding to the phosphorescent layer 3c. The superposed layers are subsequently press molded from the printed layer 5c side to join the component layers by simultaneous application of heat and pressure. Alternatively, after the phosphorescent article has been finished by press molding, the printed layer 5c may be deposited by printing on the surface of the second transparent resin layer 4c with the projected logo part 6c corresponding to the phosphorescent layer 3c kept in a masked state.

When the phosphorescent escutcheon or emblem 10c produced as described above was exposed to light and then left standing in a dark place, it produced a luminescence pattern of a letter "ATHLETIC" in a vivid and stereoscopic form and this letter manifested very high luminance and retained afterglow for a very long time. This escutcheon 10c allowed a fair reduction in the time of excitation as compared with an escutcheon which used a supporting layer of nonwoven fabric devoid of a reflecting property.

Since the phosphorescent escutcheon 10c mentioned above uses $SrAl_2O_4$, a compound only sparingly susceptible of deterioration by ultraviolet light, as the phosphorescent pigment, it does not discriminate the basis for support on account of the substance of the material thereof. It can be attached not only to an article of clothing but also to such a product as a tent which is destined to be exposed directly to the sunlight while in service. It is important that the phosphorescent layer 3c be absent in the edge part A of the escutcheon 10c lest a sewing needle should pierce the phosphorescent layer 3c while the escutcheon 10c is being sewn to an article of clothing.

The phosphorescent escutcheon 10c can be safely dry cleaned because the first and second transparent resin layers 2c and 4c for protecting the phosphorescent layer 3c are made of urethane resin. When the article of clothing to which this phosphorescent escutcheon 10c is attached is dry cleaned, therefore, the possibility that the phosphorescing property of the escutcheon 10c will be impaired by the dry cleaning is nil.

While certain specific embodiments and a working example have been disclosed herein, the invention may be embodied in other specific forms without departing from the spirit or essential characteristics thereof. The described embodiments and a example are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A phosphorescent article comprising:

a supporting layer having a white pigment incorporated therein or applied to a surface of the supporting layer to give a reflective surface, a first transparent resin layer superposed on said supporting layer, a phosphorescent layer superposed on said first transparent resin layer and comprising about 70 to about 85% by weight, based on the weight of said phosphorescent layer, of $SrAl_2O_4$ as a phosphorescent pigment, a second transparent resin layer superposed on said phosphorescent layer, and a patterned surface layer superposed on said second transparent resin layer and having a patterned through-hole so as to partly conceal a surface of said second transparent resin layer, said second transparent resin layer being provided with a projecting surface part protruding from said through-hole, said phosphorescent layer being sealed between said first and second transparent resin layers, said first and second transparent resin layers comprising a transparent resin containing no ultraviolet light absorber, the thickness of said first transparent resin layer being in the range of from about 50 to about 100 $\mu$m, the thickness of said phosphorescent layer being in the range of from about 50 to about 250 $\mu$m, and the thickness of said second transparent resin layer being in the range of from about 100 to about 400 $\mu$m.

2. The phosphorescent article according to claim 1, wherein said phosphorescent layer is formed of a synthetic resin containing $SrAl_2O_4$.

3. The phosphorescent article according to claim 1, wherein each of said first and second transparent resin layers is formed of a resin selected from the group consisting of a polyurethane, a polycarbonate, an acrylic resin, a polyvinyl chloride, and a polyester.

4. The phosphorescent article according to claim 1, wherein said first and second transparent resin layers are formed of a same synthetic resin.

5. The phosphorescent article according to claim 1, wherein said white pigment is a titanium white.

6. The phosphorescent article according to claim 1, wherein said supporting layer is formed of any one of a nonwoven fabric, a felt, a cloth, a synthetic resin sheet, and a metal sheet.

7. The phosphorescent article according to claim 1, further comprising an adhesive layer and a release layer sequentially superposed on a surface of said supporting layer opposite to a surface thereof contiguous to said first transparent resin layer.

8. The phosphorescent article according to claim 1, wherein said phosphorescent layer has a patterned part present under said through-hole of said surface layer.

9. A phosphorescent article comprising:

a supporting layer having a white pigment incorporated therein or applied to a surface of the supporting layer to give a reflective surface, a first transparent resin layer superposed on said supporting layer, a patterned phosphorescent layer superposed on said first transparent resin layer and comprising about 70 to about 85% by weight, based on the weight of said phosphorescent layer, of $SrAl_2O_4$ as a phosphorescent pigment, a second transparent resin layer superposed on said phosphorescent layer, and a patterned surface layer superposed on said second transparent resin layer and having a patterned through-hole so as to conceal a surface part of said second transparent resin layer other than a surface part which is underlain by said phosphorescent layer, said phosphorescent layer being sealed between said first and second transparent resin layers, said first and second transparent resin layers comprising a transparent resin containing no ultraviolet light absorber, the thickness of said first transparent resin layer being in the range of from about 50 to about 100 $\mu$m, the thickness of said phosphorescent layer being in the range of from about 50 to about 250 $\mu$m, and the thickness of said second transparent resin layer being in the range of from about 100 to about 400 $\mu$m.

10. The phosphorescent article according to claim 9, wherein said phosphorescent layer is formed of a synthetic resin containing $SrAl_2O_4$.

11. The phosphorescent article according to claim 9, wherein each of said first and second transparent resin layers is formed of a resin selected from the group consisting of a polyurethane, a polycarbonate, an acrylic resin, a polyvinyl chloride, and a polyester.

12. The phosphorescent article according to claim 9, wherein said first and second transparent resin layers are formed of a same synthetic resin.

13. The phosphorescent article according to claim 9, wherein said white pigment is a titanium white.

14. The phosphorescent article according to claim 9, wherein said supporting layer is formed of any one of a nonwoven fabric, a felt, a cloth, a synthetic resin sheet, and a metal sheet.

15. The phosphorescent article according to claim 9, further comprising an adhesive layer and a release layer sequentially superposed on a surface of said supporting layer opposite to a surface thereof contiguous to said first transparent resin layer.

16. The phosphorescent article according to claim 9, wherein said phosphorescent layer has a patterned part present under said through-hole of said surface layer.

* * * * *